(12) United States Patent
Sakisaka et al.

(10) Patent No.: US 11,754,093 B2
(45) Date of Patent: Sep. 12, 2023

(54) CENTRIFUGAL COMPRESSOR

(71) Applicant: IHI Corporation, Tokyo (JP)

(72) Inventors: Ryota Sakisaka, Tokyo (JP); Takashi Fujiwara, Tokyo (JP); Atsushi Yonemura, Tokyo (JP); Takahiro Bamba, Tokyo (JP)

(73) Assignee: IHI Corporation, Tokyo (JP)

( * ) Notice: Subject to any disclaimer, the term of this patent is extended or adjusted under 35 U.S.C. 154(b) by 66 days.

(21) Appl. No.: 17/646,937

(22) Filed: Jan. 4, 2022

(65) Prior Publication Data

US 2022/0120289 A1  Apr. 21, 2022

Related U.S. Application Data

(63) Continuation of application No. PCT/JP2020/032198, filed on Aug. 26, 2020.

(30) Foreign Application Priority Data

Oct. 16, 2019 (JP) .................................. 2019-189119

(51) Int. Cl.
*F04D 29/46* (2006.01)

(52) U.S. Cl.
CPC .......... *F04D 29/46* (2013.01); *F05D 2220/40* (2013.01); *F05D 2250/51* (2013.01)

(58) Field of Classification Search
CPC .... F04D 29/46; F04D 25/024; F04D 29/4213; F04D 29/464; F04D 27/002; F04D 29/083; F05D 2220/40; F05D 2250/51; Y02T 10/12
See application file for complete search history.

(56) References Cited

U.S. PATENT DOCUMENTS

| | | |
|---|---|---|
| 5,873,696 A | 2/1999 | Harada et al. |
| 2015/0041695 A1 | 2/2015 | Daniels |
| 2017/0298943 A1* | 10/2017 | Mohtar ................. F04D 29/464 |

FOREIGN PATENT DOCUMENTS

| | | |
|---|---|---|
| JP | 8-232887 A | 9/1996 |
| JP | 2009-167938 A | 7/2009 |
| JP | 2016-173051 A | 9/2016 |
| JP | 2018-59482 A | 4/2018 |
| JP | 2019-173892 A | 10/2019 |

OTHER PUBLICATIONS

Japanese Office Action dated Dec. 6, 2022 in Japanese Patent Application No. 2021-552126, 3 pages.
International Search Report dated Oct. 13, 2020 in PCT/JP2020/032198, filed on Aug. 26, 2020, 2 pages

* cited by examiner

*Primary Examiner* — Brandon D Lee
(74) *Attorney, Agent, or Firm* — Oblon, McClelland, Maier & Neustadt, L.L.P.

(57) ABSTRACT

A centrifugal compressor includes a compressor housing; a compressor impeller; a first throttling member and a second throttling member; a contacting portion provided on one end of a body of each of the first throttling member and the second throttling member; and an opposing portion provided on the other end of the body of each of the first throttling member and the second throttling member, the opposing portions being spaced apart from each other in a circumferential direction and parts of the opposing portions facing each other in a rotational axis direction when both of the first throttling member and the second throttling member are in a protruding position.

16 Claims, 14 Drawing Sheets

CENTRIFUGAL COMPRESSOR

CROSS REFERENCE TO RELATED APPLICATIONS

This application is a continuation application of International Application No. PCT/JP2020/032198, filed on Aug. 26, 2020, which claims priority to Japanese Patent Application No. 2019-189119 filed on Oct. 16, 2019, the entire contents of which are incorporated herein by reference.

BACKGROUND ART

Technical Field

The present disclosure relates to a centrifugal compressor.

A centrifugal compressor is provided in a turbocharger. The centrifugal compressor has a compressor housing and a compressor impeller. An intake flow path is formed in the compressor housing. The compressor impeller is disposed in the intake flow path.

Conventional centrifugal compressors may comprise a throttling device that throttles an intake flow path that is upstream of a compressor impeller. The throttling device of Patent Literature 1 is provided with a plurality of throttling members and a drive mechanism. The drive mechanism moves the plurality of throttling members in a radial direction of the compressor impeller. When the throttling members are driven radially inward, they contact each other in a circumferential direction of the compressor impeller to form a ring-shaped plate.

CITATION LIST

Patent Literature

Patent Literature 1: JP 2016-173051 A

SUMMARY

Technical Problem

However, when the throttling members contact each other, even if one end of the plurality of throttling members in the circumferential direction of the compressor impeller is brought into contact each other, a gap may be created at the other end due to a tolerance of the throttling members. When the gap is created, air leaks through the gap between the plurality of throttling members. When air leaks, a pressure around the compressor impeller will be uneven. If the pressure is uneven, the compressor impeller may vibrate (blade vibration) or generate an unusual noise.

An object of the present disclosure is to provide a centrifugal compressor capable of reducing air leakage between a plurality of throttling members.

Solution to Problem

In order to solve the above problem, a centrifugal compressor according to one aspect of the present disclosure includes a compressor housing including an intake flow path; a compressor impeller disposed in the intake flow path; a first throttling member and a second throttling member each including a body disposed upstream of the compressor impeller in the intake flow path and movable to a protruding position where at least a part of the body protrudes into the intake flow path; a contacting portion provided on one end of the body of each of the first throttling member and the second throttling member, the contacting portions being in contact with each other in a circumferential direction of the compressor impeller when both of the first throttling member and the second throttling member are in the protruding position; and an opposing portion provided on the other end of the body of each of the first throttling member and the second throttling member, the opposing portions being spaced apart from each other in the circumferential direction and parts of the opposing portions facing each other in a rotational axis direction of the compressor impeller when both of the first throttling member and the second throttling member are in the protruding position.

The opposing portion of the first throttling member may include a first step portion that includes, on a side spaced apart from the compressor impeller in the rotational axis direction, a first projection portion extending in the circumferential direction, and the opposing portion of the second throttling member may include a second step portion that includes, on a side closer to the compressor impeller in the rotational axis direction, a second projection portion extending in the circumferential direction.

The opposing portion of the first throttling member may include a first tapered portion including a first tapered surface intersecting the rotational axis direction and the circumferential direction, and the opposing portion of the second throttling member may include a second tapered portion including a second tapered surface that intersects the rotational axis direction and the circumferential direction.

The opposing portion of the first throttling member may include a covering portion protruding in the rotational axis direction with respect to the body of the second throttling member.

The centrifugal compressor may include an elastic member provided on at least one of the contacting portions of the first throttling member and the second throttling member.

The opposing portions of the first throttling member and the second throttling member may include opposing surfaces facing each other, and at least one of the opposing surfaces may include a projection or groove extending in a radial direction of the compressor impeller.

Effects of Disclosure

According to the present disclosure, it is possible to reduce air leakage between a plurality of throttling members.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
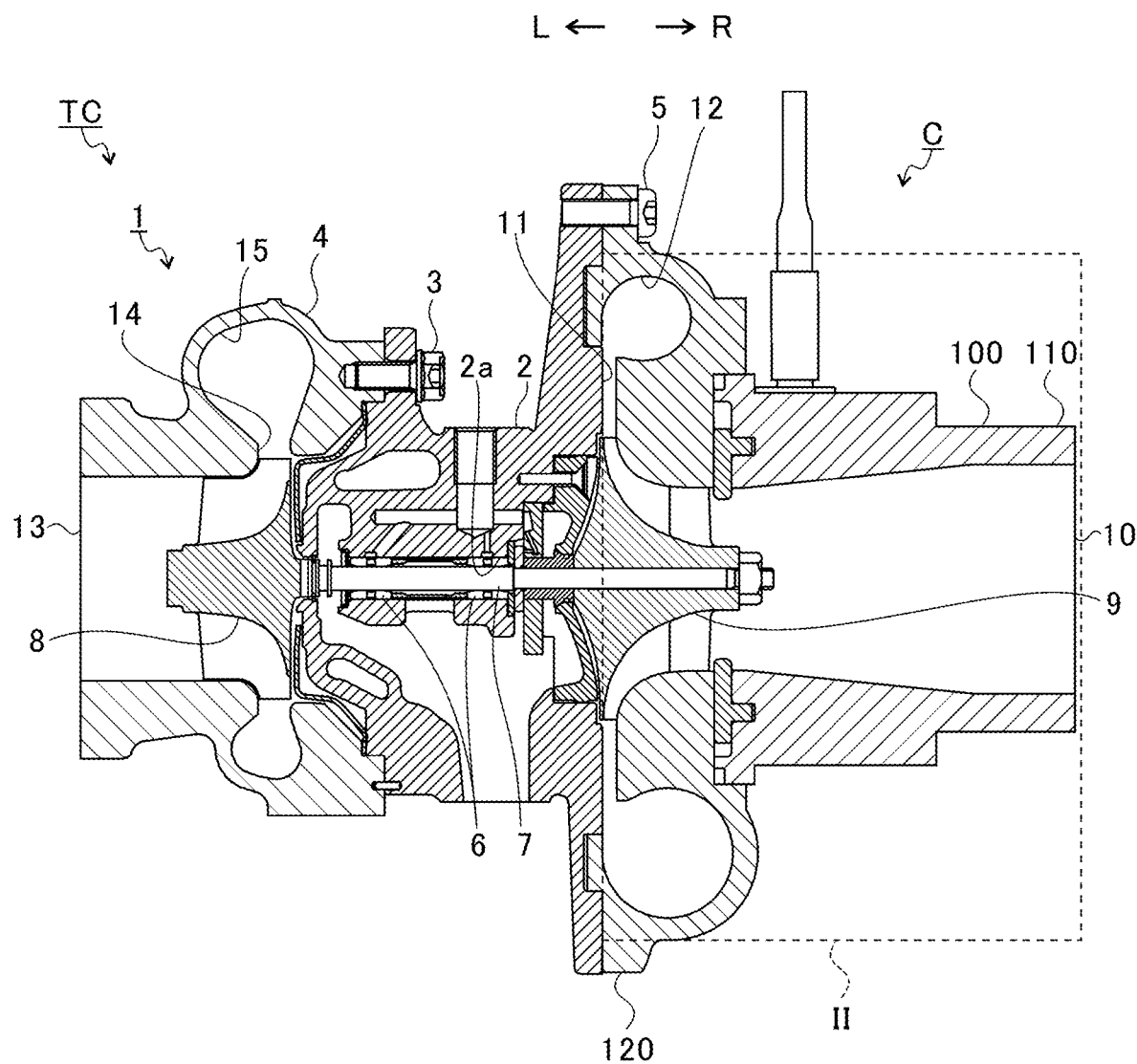
FIG. 1 is a schematic cross-sectional view of a turbocharger.

FIG. 1 is a schematic cross-sectional view of a turbocharger TC. A direction indicated by an arrow L in FIG. 1 is described as the left side of the turbocharger TC. A direction indicated by an arrow R in FIG. 1 is described as the right side of the turbocharger TC. As shown in FIG. 1, the turbocharger TC comprises a turbocharger body 1. The turbocharger body 1 includes a bearing housing 2, a turbine housing 4, and a compressor housing 100. The turbine housing 4 is connected to the left side of the bearing housing 2 by a fastening bolt 3. The compressor housing 100 is connected to the right side of the bearing housing 2 by a fastening bolt 5.

An accommodation hole 2a is formed in the bearing housing 2. The accommodation hole 2a passes through in the left-to-right direction of the turbocharger TC. A bearing 6 is disposed in the accommodation hole 2a. In FIG. 1, a full-floating bearing is shown as an example of the bearing 6. However, the bearing 6 may be any other radial bearing, such as a semi-floating bearing or a rolling bearing. A portion of a shaft 7 is disposed in the accommodation hole 2a. The shaft 7 is rotatably supported by the bearing 6. A turbine impeller 8 is provided at the left end of the shaft 7. The turbine impeller 8 is rotatably housed in the turbine housing 4. A compressor impeller 9 is provided at the right end of the shaft 7. The compressor impeller 9 is rotatably housed in the compressor housing 100.

An inlet 10 is formed in the compressor housing 100. The inlet 10 opens to the right side of the turbocharger TC. The inlet 10 is connected to an air cleaner (not shown). A diffuser flow path 11 is formed between the bearing housing 2 and the compressor housing 100. The diffuser flow path 11 pressurizes air. The diffuser flow path 11 is formed in an annular shape from the inside of the radial direction of the shaft 7 (compressor impeller 9) (hereinafter simply referred to as the radial direction) to the outside. The diffuser flow path 11 is connected to the inlet 10 via the compressor impeller 9 at the radially inner side.

A compressor scroll flow path 12 is formed in the compressor housing 100. The compressor scroll flow path 12 is formed in an annular shape. The compressor scroll flow path 12 is, for example, located radially outside the compressor impeller 9. The compressor scroll flow path 12 communicates with an intake port of an engine (not shown) and the diffuser flow path 11. When the compressor impeller 9 rotates, air is sucked into the compressor housing 100 from the inlet 10. The intake air is pressurized and accelerated while passing through blades of the compressor impeller 9. The pressurized and accelerated air is pressurized in the diffuser flow path 11 and the compressor scroll flow path 12. The pressurized air is discharged from the discharge port (not shown) and is led to the intake port of the engine.

As described above, the turbocharger TC comprises a centrifugal compressor C (compressor). The centrifugal compressor C includes the compressor housing 100, the compressor impeller 9 and the compressor scroll flow path 12, and a link mechanism 200 which will be described later.

An outlet 13 is formed in the turbine housing 4. The outlet 13 opens to the left side of the turbocharger TC. The outlet 13 is connected to an exhaust gas purifying device (not shown). Furthermore, a connecting flow path 14 and a turbine scroll flow path 15 are formed in the turbine housing 4. The turbine scroll flow path 15 is located radially outside the turbine impeller 8. The connecting flow path 14 is located between the turbine impeller 8 and the turbine scroll flow path 15.

The turbine scroll flow path 15 is connected to a gas inlet, which is not shown. Exhaust gas discharged from an exhaust manifold of the engine (not shown) is led to the gas inlet. The connecting flow path 14 connects the turbine scroll flow path 15 with the outlet 13. The exhaust gas led from the gas inlet to the turbine scroll flow path 15 is led to the outlet 13 through the connecting flow path 14 and blades of the turbine impeller 8. The exhaust gas led to the outlet 13 rotates the turbine impeller 8 while passing therethrough.

The rotational force of the turbine impeller 8 is transmitted to the compressor impeller 9 via the shaft 7. As described above, the air is pressurized by the rotational force of the compressor impeller 9 and is led to the intake port of the engine.

Figure 2:
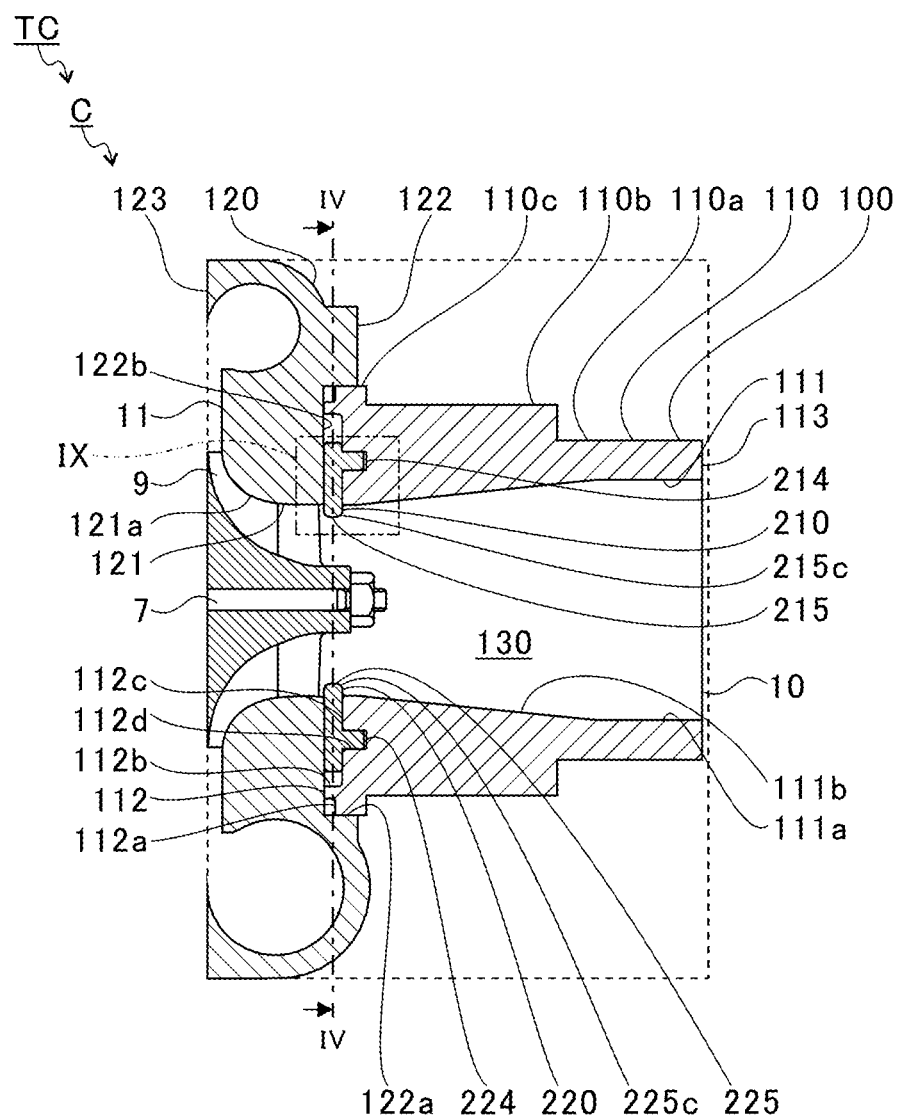
FIG. 2 is an extraction of an area enclosed by dashed lines in FIG. 1.

FIG. 2 is an extraction of an area enclosed by dashed lines in FIG. 1. As shown in FIG. 2, the compressor housing 100 includes a first housing member 110, and a second housing member 120. In FIG. 2, the first housing member 110 is located to the right of the second housing member 120 (spaced apart from the bearing housing 2). The first housing member 110 is connected to the second housing member 120.

The first housing member 110 has a substantially cylindrical shape. The first housing member 110 has a small diameter portion 110a, a medium diameter portion 110b, and a large diameter portion 110c. The small diameter portion 110a is disposed at a position furthest from the second housing member 120. The large diameter portion 110c is disposed at a position closest to the second housing member 120. The medium diameter portion 110b is located between the small diameter portion 110a and the large diameter portion 110c. The small diameter portion 110a has an outer diameter smaller than that of the medium diameter portion 110b. The medium diameter portion 110b has an outer diameter smaller than that of the large diameter portion 110c. However, the first housing member 110 may not include the small diameter portion 110a, the medium diameter portion 110h and the large diameter portion 110c. For example, the first housing member 110 may have an outer diameter that is substantially constant in the rotational axis direction of the compressor impeller 9 (hereinafter, simply referred to as the rotational axis direction or axis direction).

A through hole 111 is formed in the first housing member 110. The first housing member 110 includes an end face 112 on a side proximate (connected) to the second housing member 120. The first housing member 110 has an end face 113 on a side spaced apart from the second housing member 120. The inlet 10 is formed on the end face 113. The through hole 111 extends from the end face 112 to the end face 113 along the rotational axis direction. In other words, the through hole 111 penetrates the first housing member 110 in the rotational axis direction. The through hole 111 penetrates the small diameter portion 110a, the medium diameter portion 110b and the large-diameter portion 110c in the rotational axis direction. The through hole 111 connects with the inlet 10 at the end face 113.

The through hole 111 includes a parallel portion 111a and a tapered portion 111b. The parallel portion 111a is located closer to the end face 113 with respect to the tapered portion 111b. An inner diameter of the parallel portion 111a is substantially constant through the rotational axis direction. The tapered portion 111b is located closer to the end face 112 with respect to the parallel portion 111a. The tapered portion 111b is continuous with the parallel portion 111a. An inner diameter of the tapered portion 111b at a position continuous with the parallel portion 111a is substantially equal to the inner diameter of the parallel portion 111a. The inner diameter of the tapered portion 111b decreases as being spaced apart from the parallel portion 111a (as approaching the end face 112).

A notch 112a is formed in the end face 112. The notch 112a is depressed from the end face 112 toward the end face 113. The notch 112a is formed on an outer periphery of the end face 112. The notch 112a has, for example, a substantially annular shape when seen from the rotational axis direction.

An accommodation groove 112b is formed in the end face 112. The accommodating groove 112b is located between the notch 112a and the through hole 111. The accommodating groove 112b is depressed from the end face 112 toward the end face 113. The accommodating groove 112b has, for example, a substantially annular shape when seen from the rotational axis direction. The accommodation groove 112b is connected to the through hole 111 in the radial direction.

Bearing holes 112d are formed on the wall surface 112c on the end face 113 side in the accommodation groove 112b. The bearing hole 112d extends in the rotational axis direction from the wall surface 112c toward the end face 113. Two bearing holes 112d are provided spaced apart in the rotational direction of the compressor impeller 9 (hereinafter simply referred to as the rotational direction or circumferential direction). The two bearing holes 112d are disposed at positions spaced apart from each other by 180 degrees in the rotational direction.

A through hole 121 is formed in the second housing member 120. The second housing member 120 includes an end face 122 on a side proximate (connected) to the first housing member 110. Furthermore, the second housing member 120 includes an end face 123 on a side spaced apart from the first housing member 110 (connected to the bearing housing 2). The through hole 121 extends from the end face 122 to the end face 123 along the rotational axis direction. In other words, the through hole 121 penetrates the second housing member 120 in the rotational axis direction.

The inner diameter of the through hole 121 at an end on the end face 122 is substantially equal to the inner diameter of the through hole 111 at an end on the end face 112. A shroud portion 121a is formed on an inner wall of the through hole 121. The shroud portion 121a faces the compressor impeller 9 from radially outside. An inner diameter of the shroud portion 121a increases as approaching the end face 123. An end of the shroud portion 121a on the end face 123 is connected to the diffuser flow path 11.

An accommodation groove 122a is formed on the end face 122. The accommodating groove 122a is depressed from the end face 122 toward the end face 123. The accommodating groove 122a has, for example, a substantially annular shape when seen from the rotational axis direction. The large diameter portion 110c is inserted into the accommodating groove 122a. A wall surface 122b on the end face 123 side in the accommodation groove 122a contacts with the wall surface 112 of the first housing member 110.

An intake flow path 130 is formed by the through hole 111 of the first housing member 110 and the through hole 121 of the second housing member 120. As such, the intake flow path 130 is formed in the compressor housing 100. The intake flow path 130 connects the inlet 10 with the diffuser flow path 11. The compressor impeller 9 is provided in the intake flow path 130. A cross-sectional shape of the intake flow path 130 (through holes 111 and 121) perpendicular to the rotational axis direction is, for example, a circle around the rotational axis of the compressor impeller 9. However, the cross-sectional shape of the intake flow path 130 is not limited thereto, and may be, for example, an oval.

A sealing member (not shown) is disposed in the notch 112a of the first housing member 110. The sealing member reduces air flowing through a gap between the first housing member 110 and the second housing member 120. However, the notch 112a and the sealing member are not essential.

Figure 3:
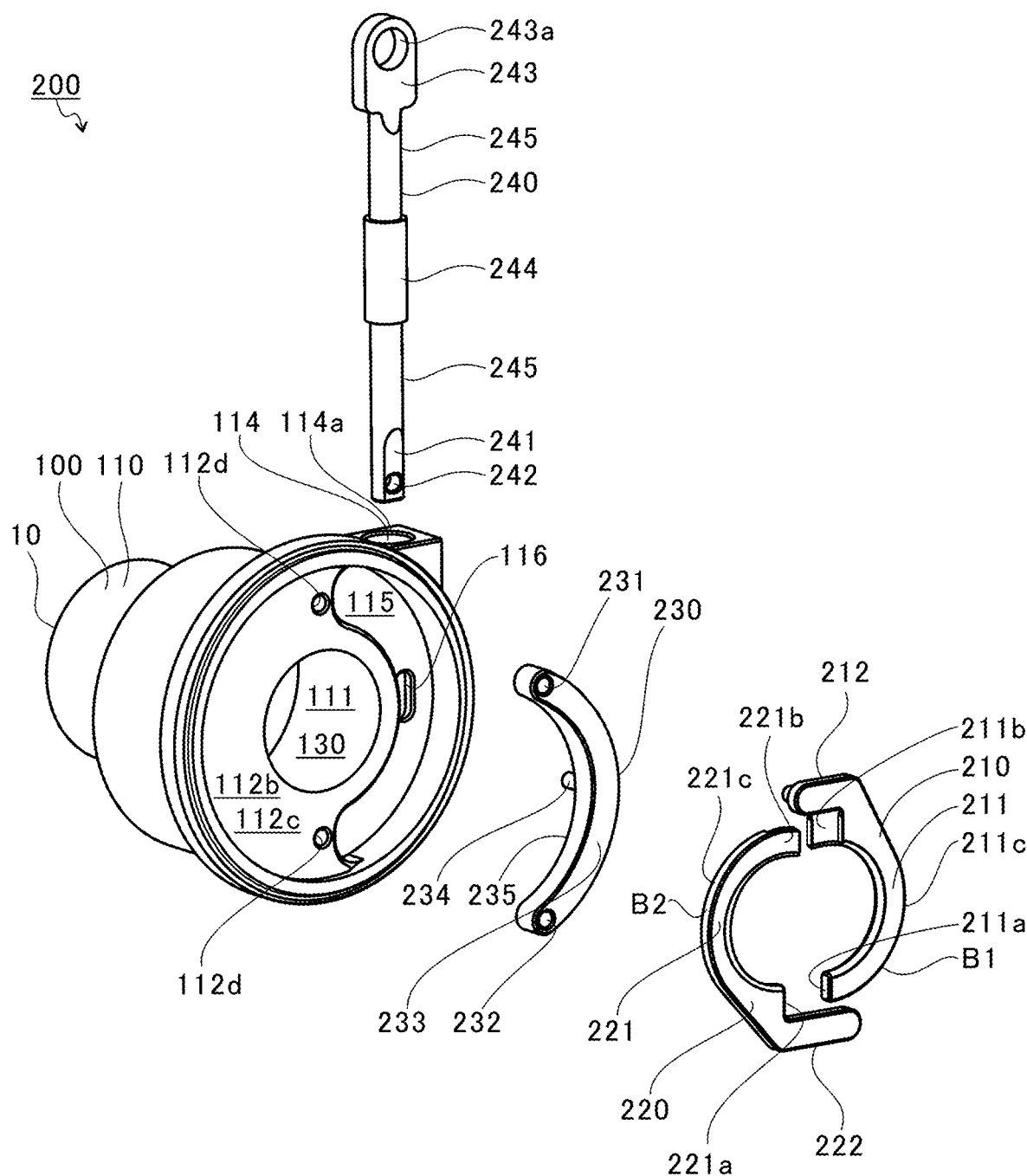
FIG. 3 is an exploded view of components of a link mechanism.

FIG. 3 is an exploded view of components of the link mechanism 200. In FIG. 3, the first housing member 110 is only shown among the compressor housing 100. As shown in FIG. 3, the link mechanism 200 includes the compressor housing 100, a first throttling member 210, a second throttling member 220, a connecting member 230, and a rod 240. The link mechanism 200 is disposed on the inlet 10 side (hereinafter, also referred to as an upstream side) in the intake flow path 130 with respect to the compressor impeller 9 in the rotational axis direction.

The first throttling member 210 is disposed in the accommodation groove 112b. Specifically, the first throttling member 210 is disposed between the wall surface 112c of the accommodating groove 112b and the wall surface 122b of the accommodation groove 122a (see FIG. 2) in the rotational axis direction. The first throttling member 210 includes a body B1. The body B1 includes a curved portion 211 and an arm portion 212.

The curved portion 211 has a substantially semicircular arc shape. The curved portion 211 includes a first contacting portion 211a formed at one end in the circumferential direction of the compressor impeller 9, and a first opposing portion 211b formed at the other end. The first contacting portion 211a includes a contacting surface parallel to the radial direction and the rotational axis direction. However, the first contacting portion 211a may include an inclined surface that is inclined to the radial direction and the rotational axis direction, or may have a curved surface or a stepped surface. Details of the first opposing portion 211b will be described later.

The arm portion 212 is provided closer to the first opposing portion 211b of the curved portion 211. The arm portion 212 extends radially outward from an outer circumferential surface 211c of the curved portion 211. The arm portion 212 extends in a direction inclined with respect to the radial direction (a direction approaching the second throttling member 220).

The second throttling member 220 is disposed in the accommodation groove 112b. Specifically, the first throttling member 210 is disposed between the wall surface 112c of the accommodation groove 112b and the wall surface 122b of the accommodation groove 122a (see FIG. 2) in the rotational axis direction. The second throttling member 220 includes a body B2. The body B2 includes a curved portion 221 and an arm portion 222.

The curved portion 221 has a substantially semicircular arc shape. The curved portion 221 includes a second contacting portion 221a formed on one end in the circumferential direction of the compressor impeller 9, and a second opposing portion 221b formed on the other end. The second contacting portion 221a includes a contacting surface parallel to the radial direction and the rotational axis direction. However, the second contacting portion 221a may include an inclined surface that is inclined to the radial direction and the rotational axis direction, or may have a curved surface or a stepped surface. The second contacting portion 221a is brought into contact with the first contacting portion 211a when the first throttling member 210 and the second throttling member 220 are close to each other. Details of the second opposing portion 221b will be described later.

The arm portion 222 is provided closer to the second contacting portion 221a of the curved portion 221. The arm portion 222 extends radially outward from an outer circumferential surface 221c of the curved portion 221. The arm portion 222 also extends in a direction inclined with respect to the radial direction (a direction approaching the first throttling member 210).

The curved portion 211 faces the curved portion 221 across the center of rotation of the compressor impeller 9 (intake flow path 130). The first contacting portion 211a faces the second contacting portion 221a in the circumferential direction. The first opposing portion 211b faces the second opposing portion 221b in the circumferential direction.

The connecting member 230 is located closer to the inlet 10 with respect to the first throttling member 210 and the second throttling member 220. The connecting member 230 has a substantially circular arc shape. The connecting member 230 includes a first bearing hole 231 formed on one end in the circumferential direction of the compressor impeller 9, and a second bearing hole 232 formed on the other end. In the connecting member 230, the first bearing hole 231 and the second bearing hole 232 are opened on an end face 233 closer to the first throttling member 210 and the second throttling member 220. The first bearing hole 231 and the second bearing hole 232 extend in the rotational axis direction. In the present embodiment, the first bearing hole 231 and the second bearing hole 232 are non-through holes. However, the first bearing hole 231 and the second bearing hole 232 may penetrate the connecting member 230 in the rotational axis direction.

The connecting member 230 includes a rod connecting portion 234 between the first bearing hole 231 and the second bearing hole 232. In the connecting member 230, the rod connecting portion 234 is formed on an end surface 235 opposite to the first throttling member 210 and the second throttling member 220. The rod connecting portion 234 protrudes in the rotational axis direction from the end face 235. The rod connecting portion 234 has, for example, a substantially cylindrical shape.

The rod 240 has a substantially cylindrical shape. The rod 240 includes a flat portion 241 formed at one end and a connecting portion 243 formed at the other end. The flat portion 241 extends in a plane direction substantially perpendicular to the rotational axis direction. A bearing hole 242 opens on the flat portion 241. The bearing hole 242 extends in the rotational axis direction. The connecting portion 243 includes a connecting hole 243a. An actuator (described later) is connected to the connecting portion 243 (to the connecting hole 243a). For example, the bearing hole 242 may be an elongated hole of which length in a direction (left-to-right direction in FIG. 6 described later) perpendicular to the rotational axis direction and the axis direction of the rod 240 is longer than a length in the axis direction of the rod 240.

The rod 240 includes a rod large diameter portion 244 and two rod small diameter portions 245, between the flat portion 241 and the connecting portion 243. The rod large diameter portion 244 is disposed between the two rod small diameter portions 245. Between the two rod small diameter portions 245, the rod small diameter 245 closer to the flat part 241 connects the rod large diameter portion 244 with the flat part 241. Between the two rod small diameter portions 245, the rod small diameter portion 245 closer to the connecting portion 243 connects the rod large diameter portion 244 to the connecting portion 243. The rod large diameter portion 244 has an outer diameter larger than those of the two rod small diameter portions 245.

An insertion hole 114 is formed in the first housing member 110. One end 114a of the insertion hole 114 opens to the outside of the first housing member 110. For example, the insertion hole 114 extends in a plane direction perpendicular to the rotational axis direction. The insertion hole 114 is located radially outside the through hole 111 (intake flow path 130). The flat portion 241 of the rod 240 is inserted into the insertion hole 114. The rod large diameter portion 244 is guided by an inner wall surface of the insertion hole 114. The rod 240 is restricted from moving in a direction other than a central axis direction of the insertion hole 114 (a central axis direction of the rod 240).

An accommodation hole 115 is formed in the first housing member 110. The accommodation hole 115 opens on the wall surface 112c of the accommodation groove 112b. The accommodation hole 115 is recessed from the wall 112c toward the inlet 10. The accommodation hole 115 is spaced apart from the inlet 10 with respect to the insertion hole 114. The accommodation hole 115 has a substantially arc shape when seen from the rotational axis direction. The accommodation hole 115 extends longer than the connecting member 230 in the circumferential direction.

A connecting hole 116 is formed in the first housing member 110. The connecting hole 116 connects the insertion hole 114 with the accommodation hole 115. The connecting hole 116 is formed in a substantially middle of the accommodation hole 115 in the circumferential direction. The connecting hole 116 is, for example, an elongated hole extending substantially parallel to the extending direction of the insertion hole 114. A width of the connecting hole 116 in the longitudinal direction (extending direction) is larger than a width in the lateral direction. The width in the lateral direction (perpendicular to the extending direction) of the insertion hole 114 is larger than an outer diameter of the rod connecting portion 234 of the connecting member 230.

The connecting member 230 is accommodated in the accommodation hole 115. The accommodation hole 115 is longer in the circumferential direction and wider in the radial direction than the connecting member 230. Therefore, the connecting member 230 is allowed to move in a plane direction perpendicular to the rotational axis direction inside the accommodation hole 115.

The rod connecting portion 234 is inserted from the connecting hole 116 into the insertion hole 114. The flat portion 241 of the rod 240 is inserted into the insertion hole 114. The bearing hole 242 of the flat portion 241 faces the connecting hole 116. The rod connecting portion 234 is inserted into (connected to) the bearing hole 242. The rod connecting portion 234 is supported by the bearing hole 242.

Figure 4:
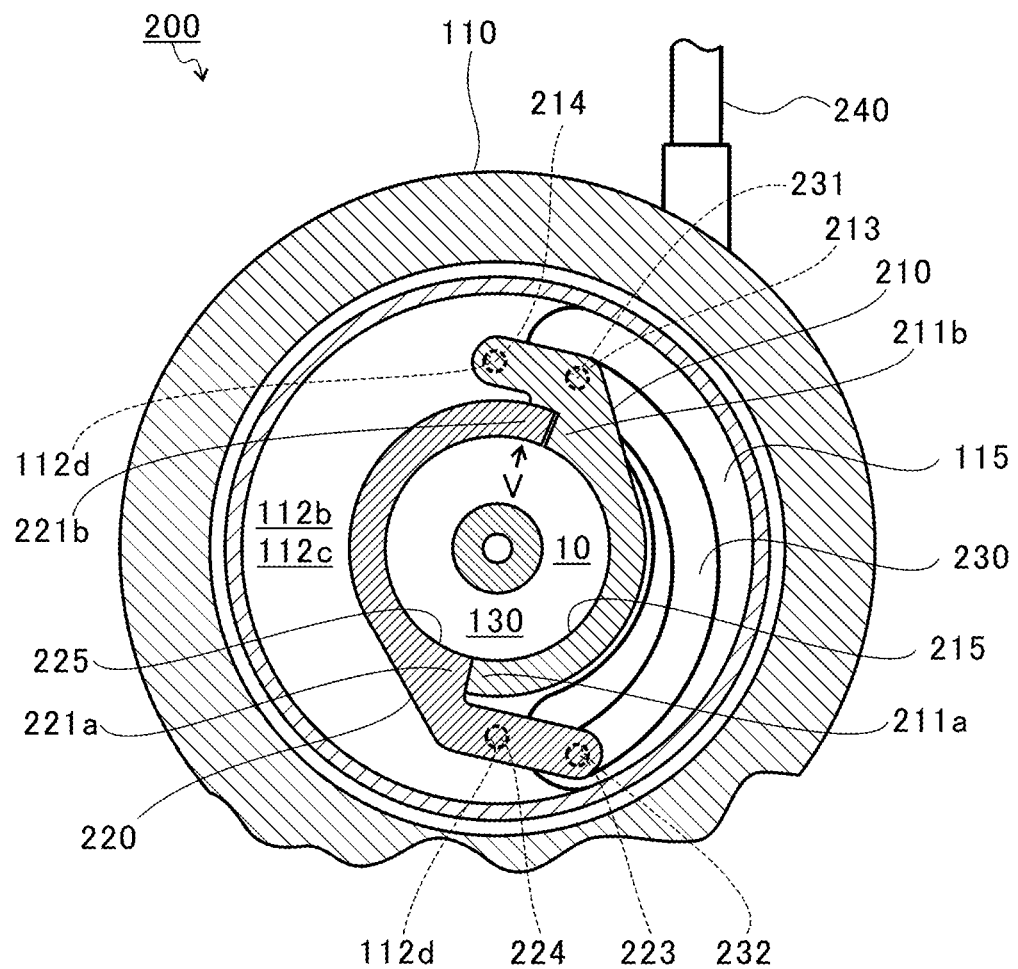
FIG. 4 is a cross-sectional view taken along IV-IV line in FIG. 2.

FIG. 4 is a cross-sectional view taken along line IV-IV in FIG. 2. As shown in dashed lines in FIG. 4, the first throttling member 210 includes a connecting shaft portion 213 and a rotational shaft portion 214. In the first throttling member 210, the connecting shaft portion 213 and the rotational shaft portion 214 protrude from an end face closer to the inlet 10 (closer to the wall surface 112c of the accommodation groove 112b) in the rotational axis direction. The connecting shaft portion 213 and the rotational shaft portion 214 extend toward the back side of the paper in FIG. 4. The rotational shaft portion 214 extends parallel to the connecting shaft portion 213. The connecting shaft portion 213 and the rotational shaft portion 214 have a substantially cylindrical shape.

An outer diameter of the connecting shaft portion 213 is smaller than an inner diameter of the first bearing hole 231 of the connecting member 230. The connecting shaft portion 213 is inserted into the first bearing hole 231. The connecting shaft portion 213 is supported by the first bearing hole 231. An outer diameter of the rotational shaft portion 214 is smaller than an inner diameter of the bearing hole 112d of the first housing member 110. The rotational shaft portion 214 is inserted into the bearing hole 112d proximate to the rod 240 between the two bearing holes 112d. The rotational shaft portion 214 is supported by the bearing holes 112d (see FIG. 2).

The second throttling member 220 includes a connecting shaft portion 223 and a rotational shaft portion 224. In the second throttling member 220, the connecting shaft portion 223 and the rotational shaft portion 224 protrude from an end face closer to the inlet 10 (closer to the wall surface 112c of the accommodation groove 112b) in the rotational axis direction. The connecting shaft portion 223 and the rotational shaft portion 224 extend to the back side of the paper in FIG. 4. The rotational shaft portion 224 extends parallel to the connecting shaft portion 223. The connecting shaft portion 223 and the rotational shaft portion 224 have a substantially cylindrical shape.

An outer diameter of the connecting shaft portion 223 is smaller than an inner diameter of the second bearing hole 232 of the connecting member 230. The connecting shaft portion 223 is inserted into the second bearing hole 232. The connecting shaft portion 223 is supported by the second bearing hole 232. An outer diameter of the rotational shaft portion 224 is smaller than an inner diameter of the bearing hole 112d of the first housing member 110. The rotational shaft portion 224 is inserted into the bearing hole 112d spaced apart from the rod 240 between the two bearing holes 112d. The rotational shaft portion 224 is supported by the bearing holes 112d (see FIG. 2).

Accordingly, the link mechanism 200 includes a four-bar linkage. The four links (nodes) are the first throttling member 210, the second throttling member 220, the first housing member 110, and the connecting member 230. Since the link mechanism 200 includes the four-bar linkage, it is a limited chain and has one degree of freedom, making it easy to control.

Figure 5:
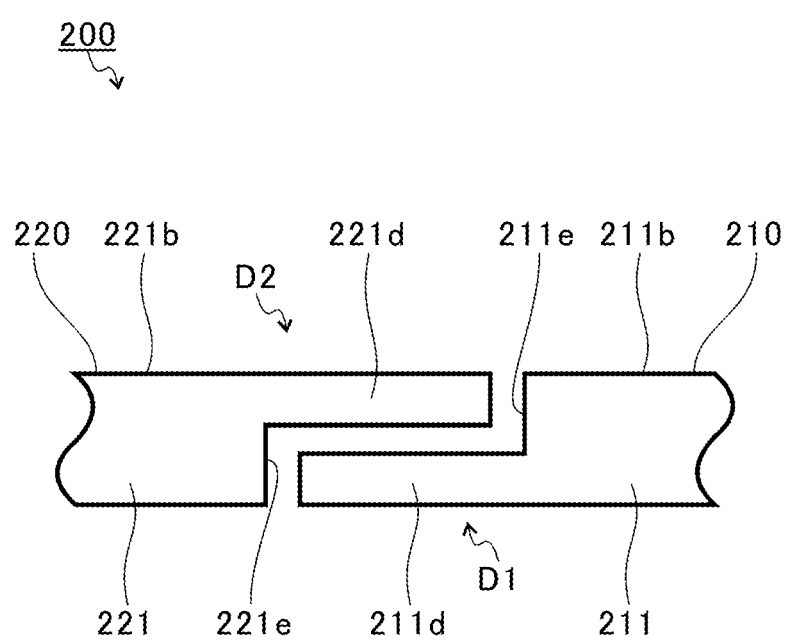
FIG. 5 is a view seen from a direction indicated by an arrow V in FIG. 4 of first and second opposing portions.

FIG. 5 is a view seen from a direction indicated by an arrow V in FIG. 4 of the first opposing portion 211b and the second opposing portion 221b. In FIG. 5, the first opposing portion 211b and the second opposing portion 221b are seen from the inner side in the radial direction. As shown in FIG. 5, the first opposing portion 211b includes a first projection portion 211d and a first depressed portion 211e. The first projection portion 211d has a thickness smaller (thinner) than a thickness of the first opposing portion 211b (the first throttling member 210) in the rotational axis direction.

In the first throttling member 210, the first projection portion 211d is disposed on a side spaced apart from the compressor impeller 9 in the rotational axis direction (lower side in FIG. 5). In the first throttling member 210, the first depression 211e is disposed on a side proximate to the compressor impeller 9 in the rotational axis direction (upper side in FIG. 5). The first projection portion 211d and the first depressed portion 211e form a first step portion D1.

The second opposing portion 221b includes a second projection portion 221d and a second depressed portion 221e. The second projection portion 221d has a thickness smaller (thinner) than a thickness of the second opposing portion 221b (the second throttling member 220) in the rotational axis direction. In the second throttling member 220, the second projection portion 221d is disposed on a side proximate to the compressor impeller 9 in the rotational axis direction (upper side in FIG. 5). In the second throttling member 220, the second depressed portion 221e is disposed on a side spaced apart from the compressor impeller 9 in the rotational axis direction (lower side in FIG. 5). The second projection portion 221d and the second depressed portion 221e form a second step portion D2.

As shown in FIG. 5, the first opposing portion 211b (the first throttling member 210) is disposed on substantially the same plane as the second opposing portion 221b (the second throttling member 220) is disposed. In other words, a surface closer to the compressor impeller 9 of the first throttling member 210 is on the same plane as a surface closer to the compressor impeller 9 of the second throttling member 220 is. A surface spaced apart from the compressor impeller 9 of the first throttling member 210 is on the same plane as a surface spaced apart from the compressor impeller 9 of the second throttling member 220 is.

The first projection portion 211d faces the second depressed portion 221e in the circumferential direction. The first projection portion 211d is spaced apart from the second depressed portion 221e in the circumferential direction. The second projection portion 221d faces the first depressed portion 211e in the circumferential direction. The second projection portion 221d is spaced apart from the first depression 211e in the circumferential direction. In other words, the first projection portion 211d is not in contact with the second depressed portion 221e. The second projection portion 221d is not in contact with the first depressed portion 211e.

A thickness of the first projection portion 211d is smaller than a thickness of the second depressed portion 221e in the rotational axis direction. A thickness of the second projection portion 221d is smaller than a thickness of the first depressed portion 211e in the rotational axis direction. The first projection portion 211d is disposed at a position different from that of the second projection portion 221d in the rotational axis direction.

The first projection portion 211d faces the second projection portion 221d in the rotational axis direction. In the present embodiment, the first projection portion 211d is spaced apart from the second projection portion 221d in the rotational axis direction. In other words, the first protrusion 211d is not in contact with the second projection portion 221d in the rotational axis direction. However, the first projection portion 211d may be in contact with the second projection portion 221d in the rotational axis direction.

In this manner, the first opposing portion 211b of the first throttling member 210 is spaced apart from the second opposing portion 221b of the second throttling member 220 at least in the circumferential direction. The first opposing portion 211b faces the second opposing portion 221b in the rotational axis direction and the circumferential direction.

Figure 6:
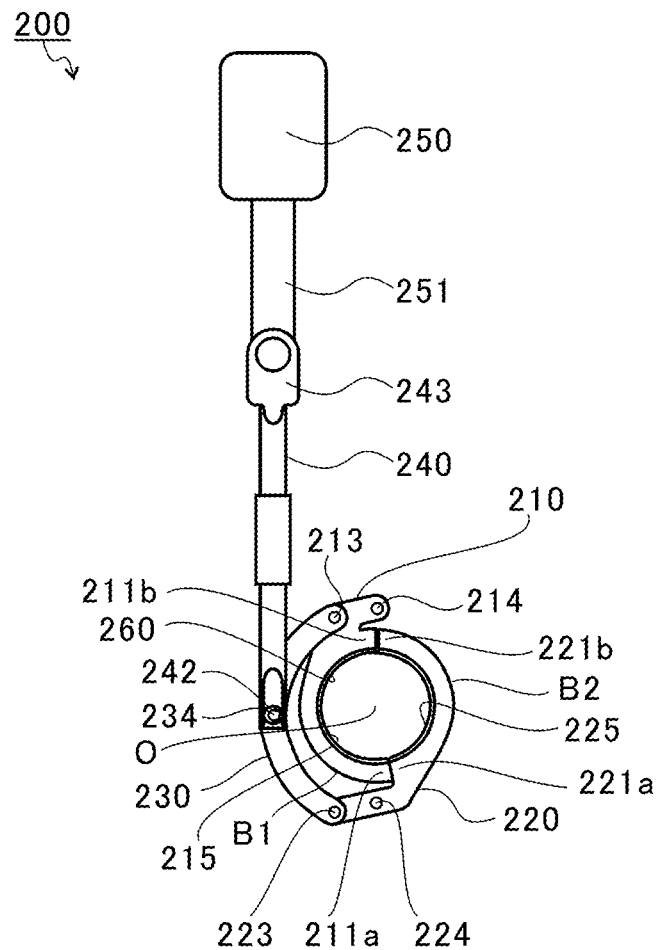
FIG. 6 is a first illustration of an operation of the link mechanism.
Figure 7:
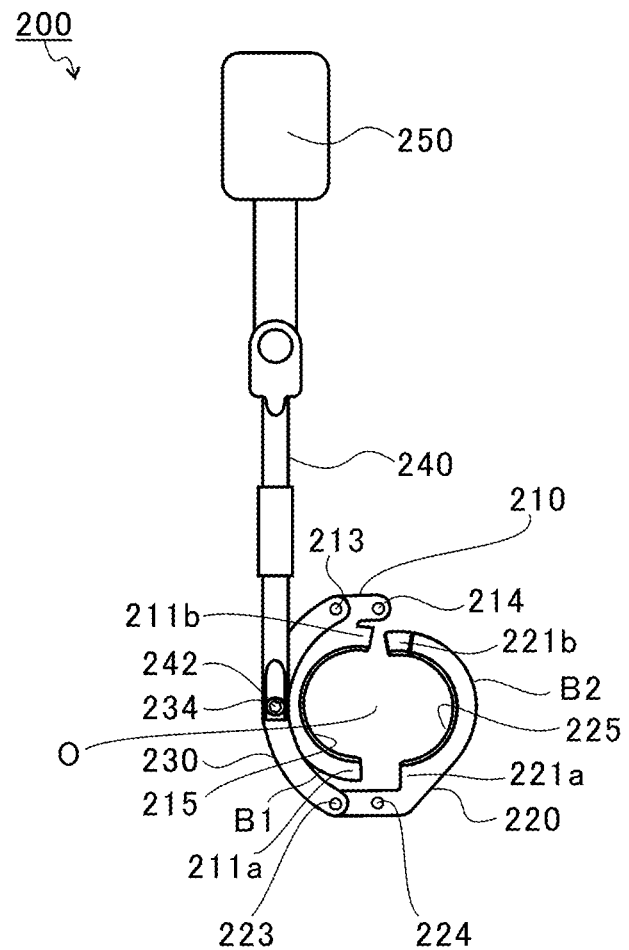
FIG. 7 is a second illustration of the operation of the link mechanism.
Figure 8:
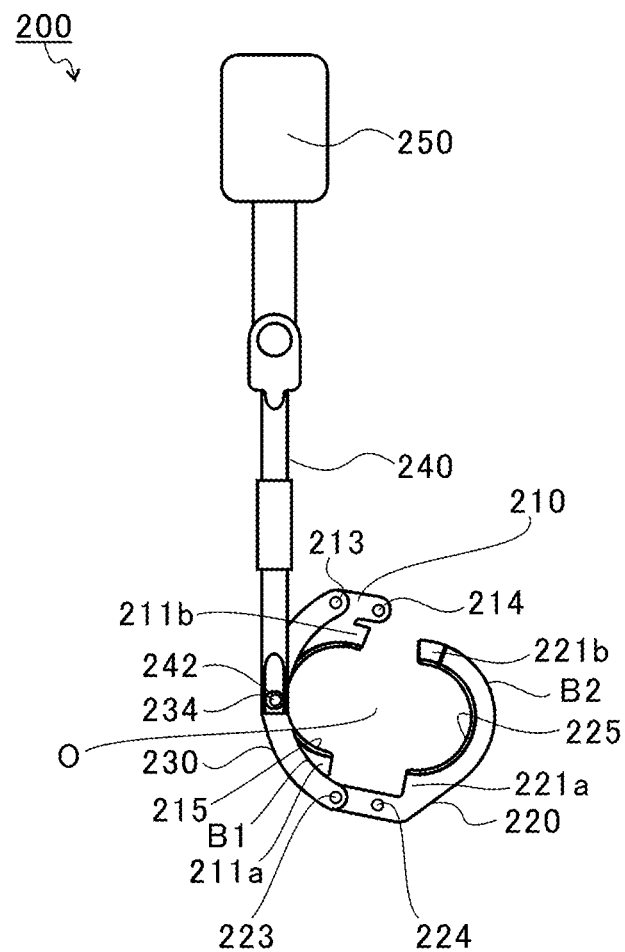
FIG. 8 is a third illustration of the operation of the link mechanism.

FIG. 6 is a first illustration of an operation of the link mechanism 200. FIG. 7 is a second illustration of the operation of the link mechanism 200. FIG. 8 is a third illustration of the operation of the link mechanism 200. In the following FIGS. 6, 7 and 8, the link mechanism 200 is seen from the inlet 10. As shown in FIG. 6, one end of a drive shaft 251 of an actuator 250 is connected to the connecting portion 243 of the rod 240.

The first throttling member 210 includes a protruding portion 215 at the radially inner part (see FIGS. 2 and 4). The protruding portion 215 protrudes into the intake flow path 130. In other words, the first throttling member 210 is movable to a protruding position where at least a part of the body B1 protrudes into the intake flow path 130. In addition, the second throttling member 220 includes a protruding portion 225 at the radially inner part (see FIGS. 2 and 4). The protruding portion 225 protrudes into the intake flow path 130. In other words, the second throttling member 220 is movable to a protruding position where at least a part of the body B2 protrudes into the intake flow path 130. The positions of the first throttling member 210 and the second throttling member 220 in this state are referred to as a throttling position or the protruding position.

In the throttling position shown in FIG. 6, the first contacting portion 211a of the first throttling member 210 contacts with the second contacting portion 221a of the second throttling member 220 in the circumferential direction. In other words, when both the first throttling member 210 and the second throttling member 220 are in the protruding position, the first contacting portion 211a and the second contacting portion 221a contact each other in the circumferential direction.

In this state, the first opposing portion 211b of the first throttling member 210 does not contact the second opposing portion 221b of the second throttling member 220 in the circumferential direction. In other words, when both the first throttling member 210 and the second throttling member 220 are in the protruding position, the first opposing portion 211b and the second opposing portion 221b are spaced apart from each other in the circumferential direction. The first opposing portion 211b faces the second opposing portion 221b in a non-contact state in the circumferential direction. When both the first throttling member 210 and the second throttling member 220 are in the protruding position, the first opposing portion 211b and the second opposing portion 221b partially face with each other in the rotational axis direction. The first opposing portion 211b faces the second opposing portion 221b in a non-contact state in the rotational axis direction.

In the throttling position, an annular hole 260 is formed by the protruding portion 215 and the protruding portion 225. An inner diameter of the annular hole 260 is smaller than the inner diameter of the intake flow path 130 at a position where the protruding portions 215 and 225 protrude. For example, the inner diameter of the annular hole 260 is smaller than the inner diameter of the intake flow path 130 at any positions.

The actuator 250 linearly moves the rod 240 in a direction intersecting the rotational axis direction (up-and-down direction in FIGS. 6, 7 and 8). FIGS. 7 and 8 show states in which the rod 240 is moved upward from the state shown in FIG. 6. An amount of movement of the rod 240 relative to the state shown in FIG. 6 is greater in the arrangement shown in FIG. 8 than in the arrangement shown in FIG. 7.

As shown in FIGS. 7 and 8, as the rod 240 moves, the connecting member 230 moves upward in FIGS. 7 and 8 through the rod connecting portion 234. In these states, the connecting member 230 is allowed to rotate around the rod connecting portion 234. In addition, there is a slight play in the inner diameter of the bearing hole 242 of the rod 240 with respect to the outer diameter of the rod connecting portion 234. Therefore, the connecting member 230 is allowed to slightly move in the plane direction perpendicular to the rotational axis direction.

As described above, the link mechanism 200 includes the four-bar linkage. The connecting member 230, the first throttling member 210 and the second throttling member 220 exhibit a behavior of one-degree-of-freedom with respect to the first housing member 110. Specifically, the connecting member 230 slightly moves in the left-to-right direction while slightly rotating in the counterclockwise direction in FIGS. 7 and 8 within the above allowable range.

The rotational shaft portion 214 of the first throttling member 210 is supported by the first housing member 110. The rotational shaft portion 214 is restricted from moving in a plane direction perpendicular to the rotational axis direction. The connecting shaft portion 213 of the first throttling member 210 is supported by the connecting member 230. The connecting shaft portion 213 is movable in the plane direction perpendicular to the rotational axis direction within the allowable range of movement of the connecting member 230. As a result, the first throttling member 210 rotates around the rotation axis portion 214 in a clockwise direction in FIGS. 7 and 8 as the connecting member 230 moves.

Similarly, the rotational shaft portion 224 of the second throttling member 220 is supported by the first housing member 110. The rotational shaft portion 224 is restricted from moving in the plane direction perpendicular to the rotational axis direction. The connecting shaft portion 223 of the second throttling member 220 is supported by the connecting member 230. The connecting shaft portion 223 is movable in the plane direction perpendicular to the rotational axis direction within the allowable range of movement of the connecting member 230. As a result, the second throttling member 220 rotates around the rotation axis portion 224 in the clockwise direction in FIGS. 7 and 8 as the connecting member 230 moves.

As such, the first throttling member 210 and the second throttling member 220 move in directions separating from each other in the order shown in FIGS. 7 and 8. The protruding portions 215 and 225 move to positions radially outside the throttling position (retracted position).

In the retracted position, the first contacting portion 211a is spaced apart from the second contacting portion 221a. Also, the first opposing portion 211b is spaced apart from the second opposing portion 221b. In this state, the first opposing portion 211b does not face the second opposing portion 221b in the rotational axis direction. In other words, the first projection portion 211d (see FIG. 5) does not face the second projection portion 221d (see FIG. 5) in the rotational axis direction.

In the retracted position, for example, the protruding portions 215 and 225 are flush with the inner wall surface of the intake flow path 130 or are located radially outside the inner wall surface of the intake flow path 130. When moving from the retracted position to the throttling position, the first throttling member 210 and the second throttling member 220 approach each other in the order of FIGS. 8, 7 and 6, and come into contact. As such, the first throttling member 210 and the second throttling member 220 are switched between the throttling position and the retracted position, depending on rotational angles around the rotational shaft portions 214 and 224.

In this manner, the first throttling member 210 and the second throttling member 220 are movable between the throttling position and the retracted position. According to the link mechanism 200, the structure for changing the flow path cross-sectional area (effective cross-sectional area) of the intake flow path 130 can be simplified.

In a conventional link mechanism, when reducing a cross-sectional area of an intake flow path, a first throttling member and a second throttling member approach (contact) each other in the circumferential direction. In this state, even if the first throttling member contacts the second throttling member at one end in the circumferential direction, the other end may not contact due to a tolerance of the first throttling member and the second throttling member, and a gap may be created.

When the gap is created, air leaks through the gap between the first and second throttling members. When air leaks, the pressure around the compressor impeller will be uneven. If the pressure is uneven, the compressor impeller may vibrate (blade vibration) or generate unusual noise.

Therefore, in the present embodiment, the first throttling member 210 includes a first contacting portion 211a and a first opposing portion 211b. The second throttling member 220 includes a second contacting portion 221a and a second opposing portion 221b. The first contacting portion 211a contacts the second contacting portion 221a in the circumferential direction. The first opposing portion 211b is spaced apart from the second opposing portion 221b in the circumferential direction (i.e., a gap is formed).

In this embodiment, the first opposing portion 211b and the second opposing portion 221b face each other in the rotational axis direction and in the circumferential direction. This makes it difficult for air to flow through the gap between the first opposing portion 211b and the second opposing portion 221b. As a result, the air leakage between the first throttling member 210 and the second throttling member 220 can be reduced.

The first opposing portion 211b and the second opposing portion 221b are spaced apart from each other (i.e., not in contact), when the first contacting portion 211a and the second opposing portion 221b contact each other. Therefore, the link mechanism 200 can make the first contacting portion 211a and the second contacting portion 221a securely contact each other. In other words, the first contacting portion 211a and the second contacting portion 221a contact each other before the first opposing portion 211b and the second contacting portion 221a contact each other.

The first contacting portion 211a and the second contacting portion 221 work as positioning portions to position the first throttling member 210 and the second throttling member 220. By contacting the first contacting portion 211a with the second contacting portion 221a, it is possible to make a circle formed by the protruding portions 215 and 225 (annular hole 260) closer to a perfect circle.

The closer the circle formed by the protruding portions 215 and 225 (annular hole 260) to a perfect circle, the more difficult the flow of air (intake air) flowing in the intake flow path 130 be disturbed. In addition, it is possible to reduce the air leakage between the first contacting portion 211a and the second contacting portion 221a, by contacting the first contacting portion 211a with the second contacting portion 221a.

Since the first opposing portion 211b and the second opposing portion 221b do not contact each other, wear between the first opposing portion 211b and the second opposing portion 221b is reduced. Therefore, the link mechanism 200 can improve a functionality of the first throttling member 210 and the second throttling member 220.

As shown in FIG. 5, the first opposing portion 211b (the first throttling member 210) is disposed on substantially the same plane as the second opposing portion 221b (the second throttling member 220) is disposed. When the first throttling member 210 and the second throttling member 220 are disposed on substantially the same plane, it is possible to reduce gaps between the wall surface 112c of the accommodation groove 112b (see FIG. 2), the wall surface 112c of the accommodation groove 122a (see FIG. 2), the first throttling member 210, and the second throttling member 220. As a result, air passing through the gaps between the accommodation groove 112b, the first throttling member 210, and the second throttling member 220 is reduced. As a result, the flow of air passing through the intake flow path 130 is less likely to be disturbed.

As shown in FIGS. 6, 7 and 8, the connecting member 230 is connected to the connecting shaft portion 213, and moves (rotates) the first throttling member 210 via the connecting shaft portion 213. The closer the connecting shaft portion 213 is to the rotational shaft portion 214, the more the connecting member 230 can move (rotate) the first throttling member 210 with a small movement.

The connecting shaft portion 213 is disposed between the rod connecting portion 234 and the rotational shaft portion 214, and is closer to the rotational shaft portion 214 with respect to a middle point between the rod connecting portion 234 and the rotational shaft portion 214. As a result, the connecting member 230 can move the first throttling member 210 more with a small movement, compared to a case where the connecting shaft portion 213 is spaced apart from the rotational shaft portion 214 with respect to the middle point between the rod connecting portion 234 and the rotational shaft portion 214. Since the movement of the connecting member 230 can be reduced, the actuator 250 can be downsized.

Similarly, the connecting member 230 is connected to the connecting shaft portion 223, and moves (rotates) the second throttling member 220 via the connecting shaft portion 223. The closer the connecting shaft portion 223 is to the rotational shaft portion 224, the more the connecting member 230 can move (rotate) the second throttling member 220 with a small movement.

The connecting shaft portion 223 is disposed between the rod connecting portion 234 and the rotational shaft portion 224, and is closer to the rotational shaft portion 224 with respect to a middle point between the rod connecting portion 234 and the rotational shaft portion 224. As a result, the connecting member 230 can move the second throttling member 220 more with a small movement, compared to a case where the connecting shaft portion 223 is spaced apart from the rotational shaft portion 224 with respect to the middle point between the rod connecting portion 234 and the rotational shaft portion 224. Since the movement of the connecting member 230 can be reduced, the actuator 250 can be downsized.

As shown in FIGS. 6, 7 and 8, a rotational center O of the compressor impeller 9 is positioned in the middle of the rotational shaft portion 214 and the rotational shaft portion 224. Therefore, the protruding portion 215 and the protruding portion 225 move along point-symmetrical trajectories around the rotational center O. In addition, the distance between the connecting shaft portion 213 and the rotational shaft portion 214 is substantially equal to the distance between the connecting shaft portion 223 and the rotational shaft portion 224. Therefore, the rotation angles of the first throttling member 210 and the second throttling member 220 are substantially equal to each other. The protruding portions 215 and 225 are disposed point-symmetrically around the rotational center O at any rotation angles. In other words, the amounts of protrusion into the intake flow path 130 are equal to each other. This makes it difficult for the flow of intake air to be disturbed.

Figure 9:
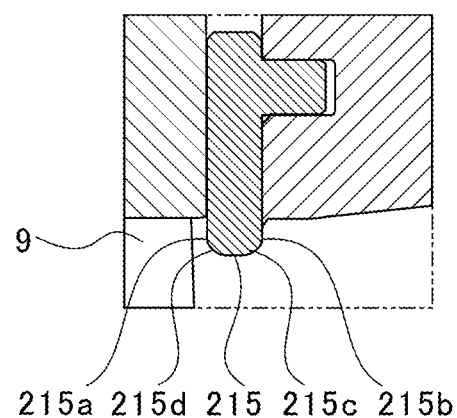
FIG. 9 is an extraction of an area enclosed by dashed double-dotted lines in FIG. 2.

FIG. 9 is an extraction of an area enclosed by dashed double-dotted lines in FIG. 2. As shown in FIG. 9, the protruding portion 215 includes an opposing surface 215a facing the compressor impeller 9. The protruding portion 215 includes an upstream surface 215b facing the inlet 10 on the opposite side of the opposing surface 215a. The upstream surface 215b includes a tapered portion 215c formed at a radially inner end. A distance from the opposing surface 215a to the tapered portion 215c decreases as moving radially inward. The tapered portion 215c is spaced apart more from the inlet 10 as moving radially inward. A shape of the tapered portion 215c in the cross section including the rotational axis of the compressor impeller 9 (hereinafter simply referred to as a cross-sectional shape) is curved as shown in FIG. 9. However, the cross-sectional shape of the tapered portion 215c may be a straight-line shape.

A tapered portion 215d is also formed on the opposing surface 215a of the protruding portion 215. However, the tapered portion 215d is not essential. The tapered portion 215c may be extended to the opposing surface 215a. In addition, while the tapered portion 215c of the protruding portion 215 has been described in detail here, a tapered portion 225c is also formed in the protruding portion 225 (see FIG. 2).

Figure 10:
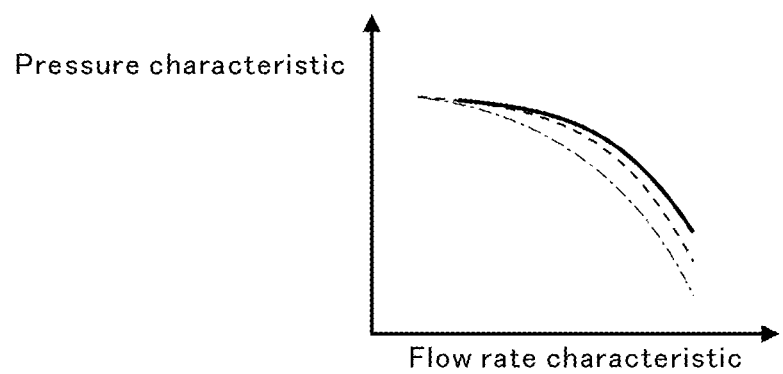
FIG. 10 is an illustration of a function of tapered portions.

FIG. 10 is an illustration of a function of the tapered portions 215c, 225c. In FIG. 10, the horizontal axis indicates a flow rate characteristic of the centrifugal compressor C, and a flow rate increases as moving to the right. The vertical axis indicates a pressure characteristic of the centrifugal compressor C, and a compression ratio increases as moving upward. In FIG. 10, the solid line indicates that the protruding portions 215 and 225 do not protrude into the intake flow path (retracted position). In FIG. 10, the dashed line indicates that the protruding portions 215 and 225 are in the throttling position, and the tapered portions 215c and 225c are formed on the protruding portions 215 and 225. In FIG. 10, the dashed dotted line indicates that the protruding portions 215 and 225 are in the throttling position, and the tapered portions 215c and 225c are not formed on the protruding portions 215 and 225.

As shown in FIG. 10, an operational range in a smaller flow rate area is expanded by moving the protruding portions 215 and 225 to the throttling position. In a larger flow rate area, the compression ratio can be increased by not having the protruding portions 215 and 225 protrude into the intake flow path 13, as indicated by the solid line. Therefore, the protruding portions 215 and 225 do not protrude into the intake air flow passage 130 in the larger flow rate area.

Suppose that the flow rate transitions from the larger flow rate area to the smaller flow rate area, and data such as a pressure characteristic obtained from a sensor (not shown) satisfies a predetermined condition. A control unit (e.g., an ECU) (not shown) controls the actuator 250 to move the protruding portions 215 and 225 to the throttling position. In this state, if the pressure characteristics of before and after the movement of the protruding portions 215 and 225 for the same flow rate characteristic deviate from each other, the pressure fluctuation in the intake air increases. Therefore, it is desirable to move the protruding portions 215 and 225 to the throttle position within the range of the flow rate characteristic where the dashed line overlaps with the solid line.

The dashed dotted line has a smaller overlapping area with the solid line. In contrast, the dashed line has a larger overlapping area with the solid line. In other words, it is possible to facilitate the control of curbing the pressure fluctuation in the intake air by forming the tapered portions 215c and 225c on the protruding portions 215 and 225.

Figure 11:
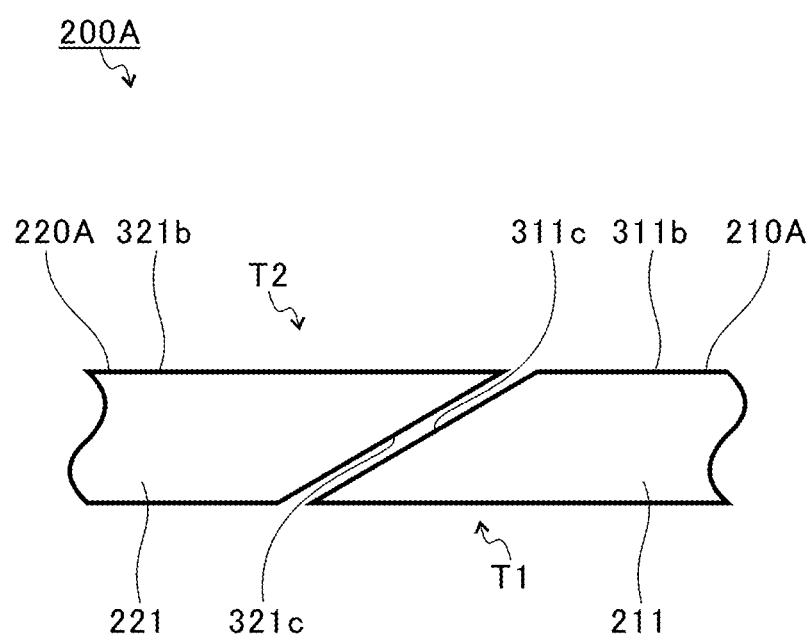
FIG. 11 is an illustration of the first and second opposing portions of a first variation.

FIG. 11 is an illustration of the first opposing portion 311b and the second opposing portion 321b of a first variation. Components substantially equal to those of the turbocharger TC of the above embodiment are assigned with the same reference signs, and the explanations thereof will be omitted. A link mechanism 200A of the first variation includes a first throttling member 210A and a second throttling member 220A.

The first throttling member 210A of the first variation is different from the first throttling member 210 of the above embodiment only in that the first opposing portion 211b is replaced with a first opposing portion 311b, and they are the same in other aspects. The second throttling member 220A is different from the second throttling member 220 of the above embodiment only in that the second opposing portion 221b is replaced with a second opposing portion 321b, and they are the same in other aspects.

The first throttling member 210A includes the curved portion 211 (see FIG. 3). The curved portion 211 includes the first contacting portion 211a (not shown in FIG. 11) formed on the one end, and the first opposing portion 311b formed on the other end. The second throttling member 220A includes the curved portion 221 (see FIG. 3). The curved portion 221 includes the second contacting portion 221a (not shown in FIG. 11) formed on the one end, and the second opposing portion 321b formed on the other end. In FIG. 11, the first opposing portion 311b and the second opposing portion 321b are seen from the radially inner side.

As shown in FIG. 11, the first opposing portion 311b includes a first tapered portion T1. A thickness of the first tapered portion T1 varies in the circumferential direction. Specifically, the thickness of the first tapered portion T1 decreases (being thinner) as being spaced apart from the first contacting portion 211a of the curved portion 211 in the circumferential direction.

In the circumferential direction, a length of the first tapered portion T1 on a side spaced apart from the compressor impeller 9 in the rotational axis direction (lower side in FIG. 11) is longer than that on a side closer to the compressor impeller 9 (upper side in FIG. 11). The first tapered portion T1 includes a first tapered surface 311c intersecting the rotational axis direction and the circumferential direction. The first tapered surface 311c is inclined so that a side spaced apart from the compressor impeller 9 (the lower side in FIG. 11) is closer to the second throttling member 220A (the left side in FIG. 11).

The second opposing portion 321b includes a second tapered portion T2. A thickness of the second tapered portion T2 varies in the circumferential direction. Specifically, the thickness of the second tapered portion T2 decreases (being thinner) as being spaced apart from the second contacting portion 221a of the curved portion 221 in the circumferential direction.

In the circumferential direction, a length of the second tapered portion T2 on a side close to the compressor impeller 9 (upper side in FIG. 11) is larger than that on a side spaced apart from the compressor impeller 9 (lower side in FIG. 11). The second tapered portion T2 includes a second tapered surface 321c that intersects the rotational axis direction and the circumferential direction. The second tapered surface 321c is inclined so that a side closer to the compressor impeller 9 (the upper side in FIG. 11) is closer to the first throttling member 210A (the right side in FIG. 11). The second tapered surface 321c is parallel to the first tapered surface 311c. However, the second tapered surface 321c may not be parallel to the first tapered surface 311c.

As shown in FIG. 11, the first opposing portion 311b (the first throttling member 210A) is disposed on substantially the same plane as the second opposing portion 321b (the second throttling member 220A) is disposed. In other words, a surface closer to the compressor impeller 9 of the first throttling member 210A is on the same plane as a surface closer to the compressor impeller 9 of the second throttling member 220A is. A surface spaced apart from the compressor impeller 9 of the first throttling member 210A is on the same plane as a surface spaced apart from the compressor impeller 9 of the second throttling member 220A is.

The first tapered portion T1 (the first tapered surface 311c) faces the second tapered portion T2 (the second tapered surface 321c) in the rotational axis direction and the circumferential direction. The first tapered portion T1 (the first tapered surface 311c) is spaced apart from the second tapered portion T2 (the second tapered surface 321c) in the rotational axis direction and the circumferential direction. In other words, the first tapered portion T1 (the first tapered surface 311c) does not contact the second tapered portion T2 (the second tapered surface 321c).

In this manner, the first opposing portion 311b of the first throttling member 210A is spaced apart from the second opposing portion 321b of the second throttling member 220A in the rotational axis direction and the circumferential direction. The first opposing portion 311b faces the second opposing portion 321b in the rotational axis direction and the circumferential direction.

According to the first variation, the same functions and effects as those of the above embodiment can be obtained. In addition, the first opposing portion 311b and the second opposing portion 321b in the first variation include the first tapered portion T1 and the second tapered portion T2, instead of the first step portion D1 and the second step portion D2 of the above embodiment. As a result, the strength of the first throttling member 210A and the second throttling member 220A can be increased, compared to the first throttling member 210 and the second throttling member 220 of the above embodiment. The first throttling member 210A and the second throttling member 220A can be manufactured more easily, compared to the first throttling member 210 and the second throttling member 220 of the above embodiment.

Figure 12:
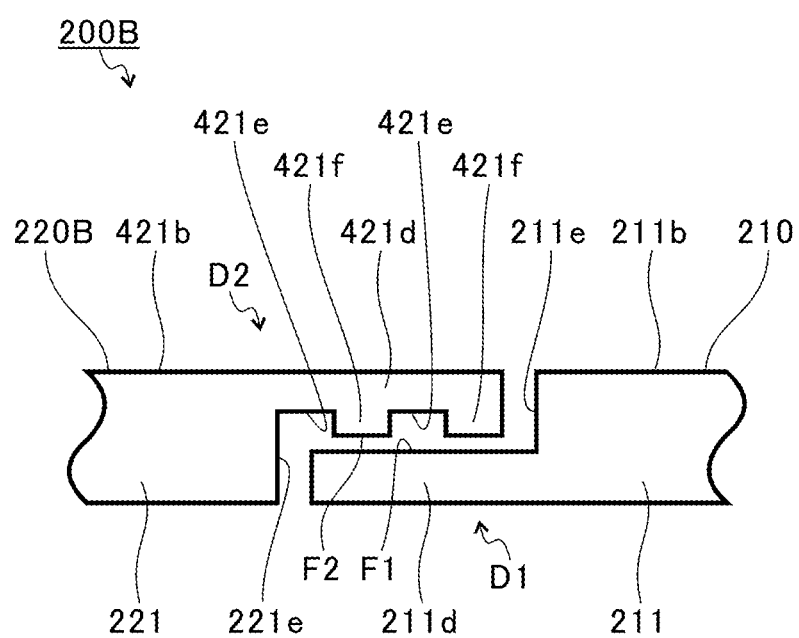
FIG. 12 is an illustration of the first and second opposing portions of a second variation.

FIG. 12 is an illustration of the first opposing portion 211b and a second opposing portion 421b of the second variation. Components substantially equal to those of the turbocharger TC of the above embodiment are assigned with the same reference signs, and explanations thereof will be omitted. A link mechanism 200B of the second variation includes the first throttling member 210, and a second throttling member 220B.

The first throttling member 210 of the second variation is the same as the first throttling member 210 of the above embodiment. Furthermore, the second throttling member 220B is different from the second throttling member 220 of the above embodiment only in that the second opposing portion 221b is replaced with the second opposing portion 421b, and they are the same in other aspects.

The second throttling member 220B includes the curved portion 221. The curved portion 221 includes the second contacting portion 221a (not shown in FIG. 12) formed on the one end, and a second opposing portion 421b formed on the other end. In FIG. 12, the first opposing portion 211b and the second opposing portion 421b are seen from the radially inner side.

The second opposing portion 421b includes a second projection portion 421d and the second depressed portion 221e. A thickness of the second projection portion 421d in the rotational axis direction is smaller (thinner) than the thickness of the second opposing portion 421b (the second throttling member 220B) in the rotational axis direction. In the second throttling member 220B, the second projection portion 421d is disposed on a side closer to the compressor impeller 9 in the rotational axis direction (upper side in FIG. 12). In the second throttling member 220B, the second depressed portion 221e is disposed on a side spaced apart from the compressor impeller 9 in the rotational axis direction (lower side in FIG. 12). The second projection portion 421d and the second depressed portion 221e form the second step portion D2.

As shown in FIG. 12, the first opposing portion 211b (the first throttling member 210) is disposed on substantially the same plane as the second opposing portion 421B (the second throttling member 220B) is disposed. In other words, the surface closer to the compressor impeller 9 of the first throttling member 210 is on the same plane as the surface closer to the compressor impeller 9 of the second throttling member 220B is. The surface spaced apart from the compressor impeller 9 of the first throttling member 210 is on the same plane as the surface spaced apart from the compressor impeller 9 of the second throttling member 220B is.

The first projection portion 211d is spaced apart from the second depressed portion 221e in the circumferential direction. The second projection portion 421d is spaced apart from the first depressed portion 211e in the circumferential direction. 421d is spaced apart from the first depression 211e in the circumferential direction. The first projection portion 211d is disposed at a position different from that of the second projection portion 421d in the rotational axis direction.

The first projection portion 211d faces the second projection portion 421d in the rotational axis direction. In the second variation, the first projection portion 211d is spaced apart from the second projection portion 421d in the rotational axis direction. In other words, the first projection portion 211d does not contact the second projection portion 421d in the rotational axis direction. However, the first projection portion 211d may contact the second projection portion 421d in the rotational axis direction.

In the second variation, the second opposing portion 421b (the second projection portion 421d) includes a plurality of grooves 4 and a plurality of projections 421f on a second opposing surface F2 facing the first opposing portion 211b (the first projection portion 211d). Each of the plurality of grooves 421e and the plurality of projections 421f extends in the radial direction.

However, the first opposing portion 211b (the first projection portion 211d) is not limited thereto, and may include the plurality of grooves 421e and the plurality of projections 421f on the first opposing surface F1 facing the second opposing portion 421b (the second projection portion 421d).

The plurality of projections 421f and the plurality of grooves 421e may be formed on both the first opposing surface F1 and the second opposing surface F2. In other words, at least one of the first opposing surface F1 or the second opposing surface F2 may include the plurality of grooves 421e and the plurality of protrusions 421f. At least one of the plurality of projections 421f or the plurality of grooves 421e may only be formed on the first opposing surface F1 and the second opposing surface F2. A single (one) projection 421f or groove 421e may be formed on the first opposing surface F1 and the second opposing surface F2.

According to the second variation, the same functions and effects as those of the above embodiment can be obtained. Furthermore, the second opposing portion 421b of the second variation is different from the second opposing portion 221b of the above embodiment in that the second opposing surface F2 includes the plurality of grooves 421e and the plurality of projections 421f (so-called "labyrinth structure"). As a result, the first throttling member 210 and the second throttling member 220B of the second variation can further reduce the air leakage between the first throttling member 210 and the second throttling member 220B, compared to the first throttling member 210 and the second throttling member 220 of the above embodiment.

Figure 13:
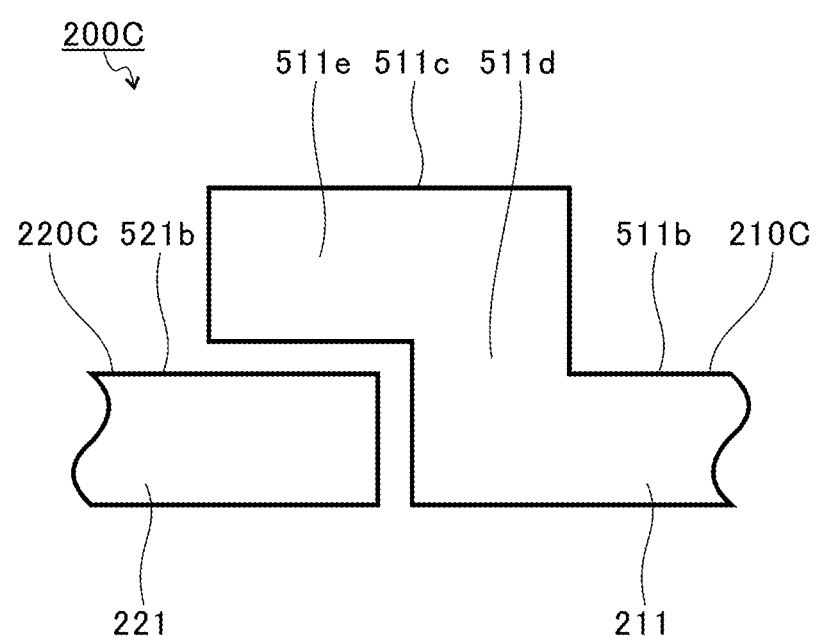
FIG. 13 is an illustration of the first and second opposing portions of a third variation.

FIG. 13 is an illustration of a first opposing portion 511b and a second opposing portion 521b of a third variation. Components substantially equal to those of the turbocharger TC of the above embodiment are assigned with the same reference signs, and the explanations thereof will be omitted. A link mechanism 200C of the third variation includes a first throttling member 210C and a second throttling member 220C.

The first throttling member 210C of the third variation is different from the first throttling member 210 of the above embodiment only in that the first opposing portion 211b is replaced with the first opposing portion 511b, and they are the same in other aspects. The second throttling member 220C is different from the second throttling member 220 of the above embodiment only in that the second opposing portion 221b is replaced with the second opposing portion 521b, and they are the same in other aspects.

The first throttling member 210C includes the curved portion 211. The curved portion 211 includes the first contacting portion 211a (not shown) formed on the one end, and the first opposing portion 511b formed on the other end. The second throttling member 220C includes the curved portion 221. The curved portion 221 includes the second contacting portion 221a (not shown) formed on the one end, and the second opposing portion 521b formed on the other end. In FIG. 13, the first opposing portion 511b and the second opposing portion 521b are seen from the radially inner side.

As shown in FIG. 13, the first opposing portion 211b includes a covering portion 511c. The covering portion 511c protrudes in the rotational axis direction. Specifically, the covering portion 511c includes a first extension portion extending in a direction approaching the compressor impeller 9 (upward in FIG. 13) along the rotational axis direction, and a second extension portion 511e extending in a direction approaching the second throttling member 220C (left side in FIG. 13) from the first extension portion 511d along the circumferential direction.

As such, the covering portion 511C protrudes in a direction closer to the compressor impeller 9 with respect to the second throttling member 220C (the body B2) in the throttling position. However, the covering portion 511c is not limited thereto, and may protrude in a direction spaced apart from the compressor impeller 9 (downward in FIG. 13) with respect to the second throttling member 220C (the body B2) in the throttling position. Specifically, the first extension portion 511d may extend in a direction spaced apart from the compressor impeller 9 along the rotational axis direction. Furthermore, the covering portion 511C may extend in both the directions closer to and spaced apart from the compressor impeller 9 with respect to the second throttling member 220C. In other words, the covering portion 511c may protrude at least either in the direction closer to or spaced apart from the compressor impeller 9 with respect to the second throttling member 220C.

The second opposing portion 521b has a constant thickness in the circumferential direction. The second opposing portion 521b has a thickness in the rotational axis direction that is substantially equal to the thickness in the rotational axis direction of the curved portion 221 (the second throttling member 220C).

As shown in FIG. 13, the covering portion 511c (the second extension portion 511e) is disposed at a position different from the second opposing portion 521b (the second throttling member 220C) in the rotational axis direction. Note that the surface closer to the compressor impeller 9 (upper side in FIG. 13) of the first throttling member 210C excluding the covering portion 511c is disposed on substantially the same plane as the surface closer to the compressor impeller 9 of the second throttling member 220 is disposed. The surface spaced apart from the compressor impeller 9 (lower side in FIG. 13) of the first throttling member 210 is disposed on substantially the same plane as the surface spaced apart from the compressor impeller 9 of the second throttling member 220 is disposed.

The covering portion 511c (the first extension portion 511d) faces the second opposing portion 521b in the circumferential direction. The covering portion 511c (the first extension portion 511d) is spaced apart from the second opposing portion 521b in the circumferential direction. In other words, the covering portion 511c (the first extension portion 511d) does not contact the second opposing portion 521b.

The covering portion 511C (the second extension portion 511e) faces the second opposing portion 521b in the rotational axis direction. In this manner, the covering portion 511c (the second extension portion 511e) covers the second opposing portion 521b in the rotational axis direction. In the third variation, the covering portion 511c (the second extension portion 511e) is spaced apart from the second opposing portion 521b in the rotational axis direction. In other words, the covering portion 511c (the second extension portion 511e) does not contact the second opposing portion 521b in the rotational axis direction. However, the covering portion 511c (the second extension portion 511e) may contact the second opposing portion 521b in the rotational axis direction.

In this manner, the first opposing portion 511b of the first throttling member 210C is spaced apart from the second opposing portion 521b of the second throttling member 220C at least in the circumferential direction. The first opposing portion 511b faces the second opposing portion 521b in the rotational axis direction and the circumferential direction.

According to the third variation, the same functions and effects as those of the above embodiment can be obtained. In addition, the first opposing portion 511b of the third variation is different from the first opposing portion 251b of the above embodiment in that the first depression part 211e is not formed and the covering part 511c is included. As a result, the first throttling member 210C of the third variation can be strengthened compared to the first throttling member 210 of the above embodiment.

Figure 14:
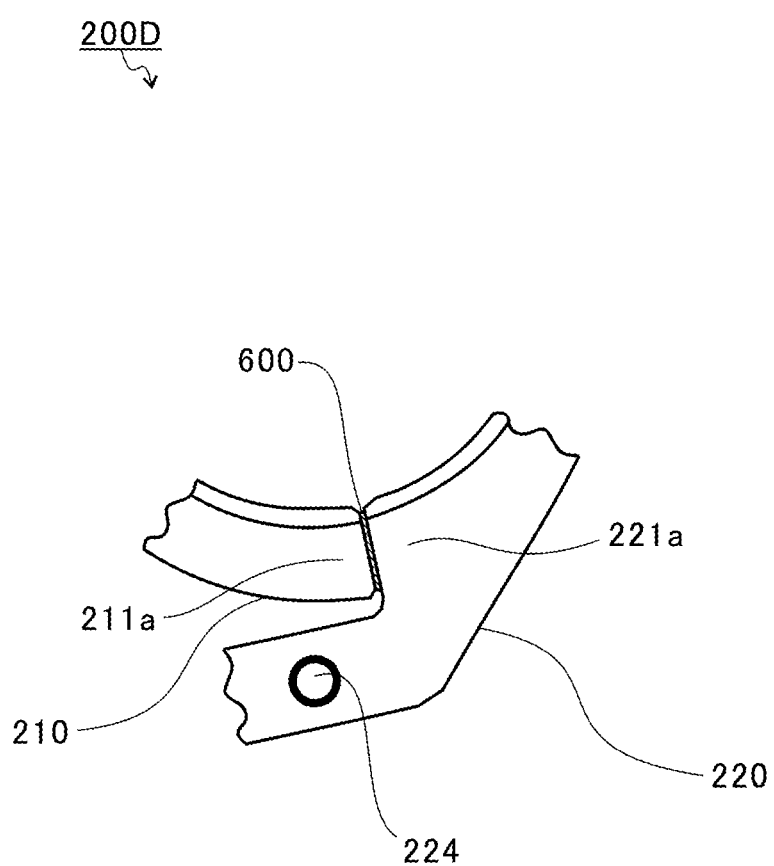
FIG. 14 is an illustration of the link mechanism of a fourth variation.

FIG. 14 is an illustration of a link mechanism 200D of a fourth variation. Components substantially equal to those of the turbocharger TC of the above embodiment are assigned with the same reference signs, and the explanations thereof will be omitted. In FIG. 14, a view of the link mechanism 200D seen from the inlet 10 is shown.

The link mechanism 200D of the fourth variation is different from the link mechanism 200 of the above embodiment only in that an elastic member 600 is disposed between the first throttling member 210 and the second throttling member 220, and they are the same in other aspects.

As shown in FIG. 14, in the link mechanism 200D, the elastic member 600 is disposed between the first contacting portion 211a of the first throttling member 210 and the second contacting portion 221a of the second throttling member 220. In the first contacting portion 211a, the elastic member 600 is disposed on a contacting surface that contacts the second contacting portion 221a. However, the elastic member 600 is not limited thereto, and may be disposed, in the second contacting portion 221a, on a contacting surface that contacts the first contacting portion 211a. The elastic member 600 may be disposed on both the first contacting portion 211a and the second contacting portion 221a. In other words, the elastic member 600 may be disposed on the contacting surface of at least one of the first contacting portion 211a and the second contacting portion 221a. The elastic member 600 is, for example, a rubber material.

According to the fourth variation, the same functions and effects as those of the above embodiment can be obtained. Furthermore, the link mechanism 200D of the fourth variation includes the elastic member 600. The elastic member 600 can curb an impact when the first contacting portion 211a and the second contacting portion 221a contact (hit) each other. As a result, the elastic member 600 can reduce abrasion of the first contacting portion 211a and the second contacting portion 221a. The elastic member 600 can reduce a noise (hitting sound) generated when the first contacting portion 211a and the second contacting portion 221a contact (hit) each other.

The elastic member 600 can improve the closeness of the first contacting portion 211a and the second contacting portions 221a. Therefore, the link mechanism 200D of the fourth variation can reduce the air leakage between the first throttling member 210 (the first contacting portion 211a) and the second throttling member 220 (the second contacting portion 221a) more, compared to the first throttling member 210 and the second throttling member 220 of the above embodiment.

Note that the elastic member 600 of the fourth variation can be applied to the link mechanism 200A of the first variation, the link mechanism 200B of the second variation, and the link mechanism 200C of the third variation.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment, the centrifugal compressor C is incorporated into the turbocharger TC. However, the centrifugal compressor C may be incorporated into a device other than the turbocharger TC, or may be a stand-alone device.

In the above embodiment, the link mechanism 200 includes two throttling members (the first throttling member 210 and a second throttling member 220). However, the link mechanism 200 may include three or more throttling members.

In the above embodiment, the link mechanism 200 is configured as the four-bar linkage. However, the link mechanism 200 may not be configured as the four-bar linkage. For example, the link mechanism 200 may be configured as a five-bar linkage.

In the above embodiment, the rotational center O of the compressor impeller 9 is located in the middle of the rotational shaft portion 214 and the rotational shaft portion 224. However, the rotational center O of the compressor impeller 9 may deviate from the middle of the rotational shaft portion 214 and the rotational shaft portion 224.

In the above embodiment, the tapered portions 215c and 225c are formed on the protruding portions 215 and 225. However, the tapered portions 215c and 225c are not essential.

In the above second variation, the labyrinth structure (i.e., the plurality of grooves 421e and the plurality of projections 421e) is provided on the opposing surfaces of the first opposing portion 211b and the second opposing portion 421b. This labyrinth structure may be provided on the opposing surfaces of the first opposing portion 311b and the second opposing portion 321b of the first variation (the first tapered surface 311c and the second tapered surface 321c). Furthermore, the labyrinth structure may be provided on the opposing surfaces of the first opposing portion 511b and the second opposing portion 521b of the third variation.

What is claimed is:
1. A centrifugal compressor comprising:
a compressor housing including an intake flow path;
a compressor impeller disposed in the intake flow path;
a first throttling member and a second throttling member each including a body disposed upstream of the compressor impeller in the intake flow path and movable to a protruding position where at least a part of the body protrudes into the intake flow path;
a contacting portion provided on one end of the body of each of the first throttling member and the second throttling member, the contacting portions being in contact with each other in a circumferential direction of the compressor impeller when both of the first throttling member and the second throttling member are in the protruding position; and
an opposing portion provided on the other end of the body of each of the first throttling member and the second throttling member, the opposing portions being spaced apart from each other in the circumferential direction and parts of the opposing portions facing each other in a rotational axis direction of the compressor impeller when both of the first throttling member and the second throttling member are in the protruding position.

2. The centrifugal compressor according to claim 1, wherein the opposing portion of the first throttling member includes a first step portion that includes, on a side spaced apart from the compressor impeller in the rotational axis direction, a first projection portion extending in the circumferential direction, and
the opposing portion of the second throttling member includes a second step portion that includes, on a side closer to the compressor impeller in the rotational axis direction, a second projection portion extending in the circumferential direction.

3. The centrifugal compressor according to claim 1, wherein the opposing portion of the first throttling member includes a first tapered portion including a first tapered surface intersecting the rotational axis direction and the circumferential direction, and the opposing portion of the second throttling member includes a second tapered portion including a second tapered surface that intersects the rotational axis direction and the circumferential direction.

4. The centrifugal compressor according to claim 1, wherein the opposing portion of the first throttling member includes a covering portion protruding in the rotational axis direction with respect to the body of the second throttling member.

5. The centrifugal compressor according to claim 1, comprising an elastic member provided on at least one of the contacting portions of the first throttling member and the second throttling member.

6. The centrifugal compressor according to claim 2, comprising an elastic member provided on at least one of the contacting portions of the first throttling member and the second throttling member.

7. The centrifugal compressor according to claim 3, comprising an elastic member provided on at least one of the contacting portions of the first throttling member and the second throttling member.

8. The centrifugal compressor according to claim 4, comprising an elastic member provided on at least one of the contacting portions of the first throttling member and the second throttling member.

9. The centrifugal compressor according to claim 1, wherein the opposing portions of the first throttling member and the second throttling member include opposing surfaces facing each other, and at least one of the opposing surfaces includes a projection or groove extending in a radial direction of the compressor impeller.

10. The centrifugal compressor according to claim 2, wherein the opposing portions of the first throttling member and the second throttling member include opposing surfaces facing each other, and at least one of the opposing surfaces includes a projection or groove extending in a radial direction of the compressor impeller.

11. The centrifugal compressor according to claim 3, wherein the opposing portions of the first throttling member and the second throttling member include opposing surfaces facing each other, and at least one of the opposing surfaces includes a projection or groove extending in a radial direction of the compressor impeller.

12. The centrifugal compressor according to claim 4, wherein the opposing portions of the first throttling member and the second throttling member include opposing surfaces facing each other, and at least one of the opposing surfaces includes a projection or groove extending in a radial direction of the compressor impeller.

13. The centrifugal compressor according to claim 5, wherein the opposing portions of the first throttling member and the second throttling member include opposing surfaces facing each other, and at least one of the opposing surfaces includes a projection or groove extending in a radial direction of the compressor impeller.

14. The centrifugal compressor according to claim 6, wherein the opposing portions of the first throttling member and the second throttling member include opposing surfaces facing each other, and at least one of the opposing surfaces includes a projection or groove extending in a radial direction of the compressor impeller.

15. The centrifugal compressor according to claim 7, wherein the opposing portions of the first throttling member and the second throttling member include opposing surfaces facing each other, and at least one of the opposing surfaces includes a projection or groove extending in a radial direction of the compressor impeller.

16. The centrifugal compressor according to claim 8, wherein the opposing portions of the first throttling member and the second throttling member include opposing surfaces facing each other, and at least one of the opposing surfaces includes a projection or groove extending in a radial direction of the compressor impeller.

* * * * *